United States Patent
Matsumoto et al.

(10) Patent No.: US 7,667,342 B2
(45) Date of Patent: Feb. 23, 2010

(54) POWER SUPPLY FOR A VEHICLE

(75) Inventors: Takaie Matsumoto, Shizuoka-ken (JP);
Yukiharu Hosoi, Shizuoka-ken (JP);
Shigeto Suzuki, Shizuoka-ken (JP);
Takeshi Ikeda, Shizuoka-ken (JP);
Toshinori Fukudome, Shizuoka-ken (JP)

(73) Assignee: Yamaha Hatsudoki Kabushiki Kaisha, Shizuoka (JP)

( * ) Notice: Subject to any disclaimer, the term of this patent is extended or adjusted under 35 U.S.C. 154(b) by 417 days.

(21) Appl. No.: 11/687,452

(22) Filed: Mar. 16, 2007

(65) Prior Publication Data
US 2007/0216452 A1 Sep. 20, 2007

(30) Foreign Application Priority Data
Mar. 17, 2006 (JP) ............................. 2006-075499

(51) Int. Cl.
*F02D 29/06* (2006.01)
*H02P 11/00* (2006.01)

(52) U.S. Cl. ...................................... 290/40 C; 322/28

(58) Field of Classification Search ............... 290/40 R, 290/40 C, 1 A, 1 R, 2; 180/65.29, 65.31, 180/65.24, 65.245, 65.51, 65.21; 322/24, 322/28; 363/58, 37, 17; 307/10.1; 136/244; 429/100
See application file for complete search history.

(56) References Cited

U.S. PATENT DOCUMENTS
3,303,411 A * 2/1967 Gately ........................ 323/275
(Continued)

FOREIGN PATENT DOCUMENTS
EP 0 555 773 8/1993
(Continued)

OTHER PUBLICATIONS
European Search Report for European Application No. EP 07 00 5511 dated May 16, 2007.
(Continued)

*Primary Examiner*—Julio C. Gonzalez
(74) *Attorney, Agent, or Firm*—Keating & Bennett, LLP

(57) ABSTRACT

A power supply system that supplies high-voltage power to a vehicle drive motor is provided to achieve reduction in size, weight and cost of power supply. The power supply system includes a plurality of battery modules connected in series. With the intermediate connection point of the battery modules as an electrical neutral point, power is supplied to a three-level inverter via a three-level-potential high-voltage power supply line having potentials of +150V and −150V relative to this neutral point. In the three-level inverter, direct-current electric power is converted into three-phase alternating-current electric power to drive an electric motor. Accordingly, the withstand-voltage performance required of control units or control elements connected to the high-voltage power supply line can be halved as compared with the related art, thereby allowing a reduction in the size, weight, and cost of the power supply system. Further, the electric power generated by a generator is converted into direct-current electric power by a three-level converter and supplied to the high-voltage power supply line to charge the battery modules.

13 Claims, 3 Drawing Sheets

U.S. PATENT DOCUMENTS

| | | | |
|---|---|---|---|
| 3,566,165 A | | 2/1971 | Lohr |
| 3,678,370 A | * | 7/1972 | Gately .................. 323/277 |
| 3,858,105 A | * | 12/1974 | Gyugyi .................. 363/160 |
| 3,921,745 A | | 11/1975 | McCulloch et al. |
| 4,132,281 A | | 1/1979 | Gaddi |
| 4,467,407 A | | 8/1984 | Asano |
| 4,536,668 A | | 8/1985 | Boyer |
| 4,763,538 A | | 8/1988 | Fujita et al. |
| 4,829,208 A | | 5/1989 | Uchino |
| 5,014,800 A | | 5/1991 | Kawamoto et al. |
| 5,024,113 A | | 6/1991 | Ito et al. |
| 5,036,213 A | | 7/1991 | Isozumi |
| 5,087,229 A | | 2/1992 | Hewko et al. |
| 5,144,183 A | | 9/1992 | Farrenkopf |
| 5,253,157 A | * | 10/1993 | Severinsky .................. 363/98 |
| 5,272,938 A | | 12/1993 | Hsu et al. |
| 5,294,853 A | | 3/1994 | Schluter et al. |
| 5,304,878 A | | 4/1994 | Oda et al. |
| 5,442,250 A | | 8/1995 | Stridsberg |
| 5,505,277 A | | 4/1996 | Suganuma et al. |
| 5,517,401 A | * | 5/1996 | Kinoshita et al. ............ 363/98 |
| 5,570,752 A | | 11/1996 | Takata |
| 5,581,136 A | | 12/1996 | Li |
| 5,588,498 A | | 12/1996 | Kitada |
| 5,595,257 A | | 1/1997 | Yoshida et al. |
| 5,691,584 A | | 11/1997 | Toida et al. |
| 5,755,304 A | | 5/1998 | Trigg et al. |
| 5,798,702 A | | 8/1998 | Okamoto et al. |
| 5,818,134 A | | 10/1998 | Yang et al. |
| 5,826,675 A | | 10/1998 | Yamamoto |
| 5,899,828 A | | 5/1999 | Yamazaki et al. |
| 5,915,493 A | | 6/1999 | Nakayama |
| 5,960,901 A | | 10/1999 | Hanagan |
| 6,011,366 A | | 1/2000 | Murakami et al. |
| 6,046,518 A | | 4/2000 | Williams |
| 6,048,289 A | | 4/2000 | Hattori et al. |
| 6,116,363 A | | 9/2000 | Frank |
| 6,121,711 A | | 9/2000 | Nakahara et al. |
| 6,155,366 A | | 12/2000 | Lin |
| 6,158,543 A | | 12/2000 | Matsuto et al. |
| 6,190,282 B1 | | 2/2001 | Deguchi et al. |
| 6,190,283 B1 | | 2/2001 | Uchida |
| 6,199,652 B1 | | 3/2001 | Mastroianni et al. |
| 6,252,377 B1 | | 6/2001 | Shibutani et al. |
| 6,276,481 B1 | | 8/2001 | Matsuto et al. |
| 6,315,068 B1 | | 11/2001 | Hoshiya |
| 6,321,863 B1 | | 11/2001 | Vanjani |
| 6,522,959 B1 | | 2/2003 | Sawamura et al. |
| 6,590,306 B2 | | 7/2003 | Terada |
| 6,736,227 B2 | * | 5/2004 | Huang et al. ............ 180/65.25 |
| 6,752,226 B2 | | 6/2004 | Naito et al. |
| 6,765,327 B2 | | 7/2004 | Hashimoto et al. |
| 6,799,650 B2 | | 10/2004 | Komiyama et al. |
| 6,823,954 B2 | | 11/2004 | Shimabukuro et al. |
| 6,994,652 B2 | | 2/2006 | Atarashi et al. |
| 7,006,906 B2 | | 2/2006 | Kobayashi et al. |
| 7,017,694 B2 | | 3/2006 | Shirazawa |
| 7,023,102 B2 | | 4/2006 | Itoh |
| 7,047,116 B2 | | 5/2006 | Ishikawa et al. |
| 7,071,642 B2 | | 7/2006 | Wilton et al. |
| 7,077,223 B2 | | 7/2006 | Kubodera et al. |
| 7,104,347 B2 | | 9/2006 | Severinsky et al. |
| 7,223,200 B2 | | 5/2007 | Kojima et al. |
| 7,228,209 B2 | | 6/2007 | Izawa et al. |
| 7,328,091 B2 | | 2/2008 | Kimura |
| 7,342,342 B2 | | 3/2008 | Naitou et al. |
| 2001/0010439 A1 | | 8/2001 | Klingler et al. |
| 2002/0069000 A1 | * | 6/2002 | Nakao .................. 701/22 |
| 2003/0019455 A1 | | 1/2003 | Seiji et al. |
| 2003/0026118 A1 | * | 2/2003 | Ikimi et al. ............ 363/132 |
| 2003/0221887 A1 | | 12/2003 | Hsu |
| 2004/0055799 A1 | | 3/2004 | Atarashi et al. |
| 2004/0060753 A1 | | 4/2004 | Masatoshi et al. |
| 2004/0155603 A1 | * | 8/2004 | Clegg .................. 315/291 |
| 2004/0158365 A1 | | 8/2004 | Tabata et al. |
| 2004/0173393 A1 | | 9/2004 | Laszlo et al. |
| 2004/0213371 A1 | | 10/2004 | Bruder et al. |
| 2004/0257033 A1 | | 12/2004 | Kubota et al. |
| 2005/0111246 A1 | | 5/2005 | Lai |
| 2006/0030454 A1 | | 2/2006 | Uchisasai et al. |
| 2006/0032690 A1 | | 2/2006 | Inomoto et al. |
| 2006/0090945 A1 | | 5/2006 | Ishida et al. |
| 2006/0194101 A1 | | 8/2006 | Ha et al. |
| 2006/0207812 A1 | | 9/2006 | Saitou |
| 2006/0219447 A1 | | 10/2006 | Saitou et al. |
| 2006/0260851 A1 | | 11/2006 | Taue et al. |
| 2006/0289208 A1 | | 12/2006 | Katsuhiro et al. |
| 2006/0289214 A1 | | 12/2006 | Katsuhiro et al. |
| 2007/0017723 A1 | | 1/2007 | Terada et al. |
| 2007/0029121 A1 | | 2/2007 | Saitou et al. |
| 2007/0216226 A1 | | 9/2007 | Matsumoto et al. |

FOREIGN PATENT DOCUMENTS

| | | |
|---|---|---|
| EP | 0 604 981 A2 | 7/1994 |
| EP | 0 819 561 A2 | 1/1998 |
| EP | 0 980 821 A2 | 2/2000 |
| EP | 1 065 362 A1 | 1/2001 |
| EP | 1 151 892 | 11/2001 |
| EP | 1 270 302 | 1/2003 |
| EP | 1 447 282 A2 | 8/2004 |
| EP | 1 447 530 | 8/2004 |
| EP | 1 518 737 | 3/2005 |
| EP | 1 526 020 | 4/2005 |
| EP | 1 574 379 | 9/2005 |
| EP | 1 705 049 A2 | 9/2006 |
| JP | 2-7702 | 1/1990 |
| JP | 2-37027 | 2/1990 |
| JP | 3-215154 | 9/1991 |
| JP | 4-185207 | 7/1992 |
| JP | 5-300712 | 11/1993 |
| JP | 8-175474 | 7/1996 |
| JP | 8-175477 | 7/1996 |
| JP | 8-256403 | 10/1996 |
| JP | 9-191501 | 7/1997 |
| JP | 10-080001 | 3/1998 |
| JP | 11-122886 | 4/1999 |
| JP | 11-034965 | 9/1999 |
| JP | 2000-337192 | 5/2000 |
| JP | 2000-261911 | 9/2000 |
| JP | 2000-261988 | 9/2000 |
| JP | 2000-343964 | 12/2000 |
| JP | 2001-105899 | 4/2001 |
| JP | 2001-298901 | 10/2001 |
| JP | 2001-341685 | 12/2001 |
| JP | 2002-021601 | 1/2002 |
| JP | 2002-262404 | 9/2002 |
| JP | 2002-325412 | 11/2002 |
| JP | 2003-191761 | 7/2003 |
| JP | 2003-191883 | 7/2003 |
| JP | 2004-007919 | 1/2004 |
| JP | 2004-060498 | 2/2004 |
| JP | 2004-166369 | 10/2004 |
| JP | 2005-98251 | 4/2005 |
| WO | WO 00/43259 A1 | 7/2000 |
| WO | WO 2004/054836 | 7/2004 |

OTHER PUBLICATIONS

U.S. App. No. 11/687,488, filed Mar. 16, 2007, Matsumoto, et al.
European Search Report for EP 1 270 395, dated Mar. 23, 2005.
European Search Report for EP 06 01 2978, dated Dec. 20, 2006.
European Search Report for EP 06 01 2979, dated Oct. 3, 2006.
European Search Report for EP 07 00 3224, dated Apr. 24, 2007.

Non-final Office Action mailed Oct. 15, 2007 received in U.S. Appl. No. 11/389,514.
Non-final Office Action mailed Nov. 20, 2007 received in U.S. Appl. No. 11/426,244.
Non-final Office Action mailed May 22, 2008 received in U.S. Appl. No. 11/426,244.
Non-final Office Action mailed Jun. 9, 2008 received in U.S. Appl. No. 11/429,116.
Non-final Office Action mailed on May 18, 2009 in U.S. Appl. No. 11/687,488.

* cited by examiner

[FIG. 1]
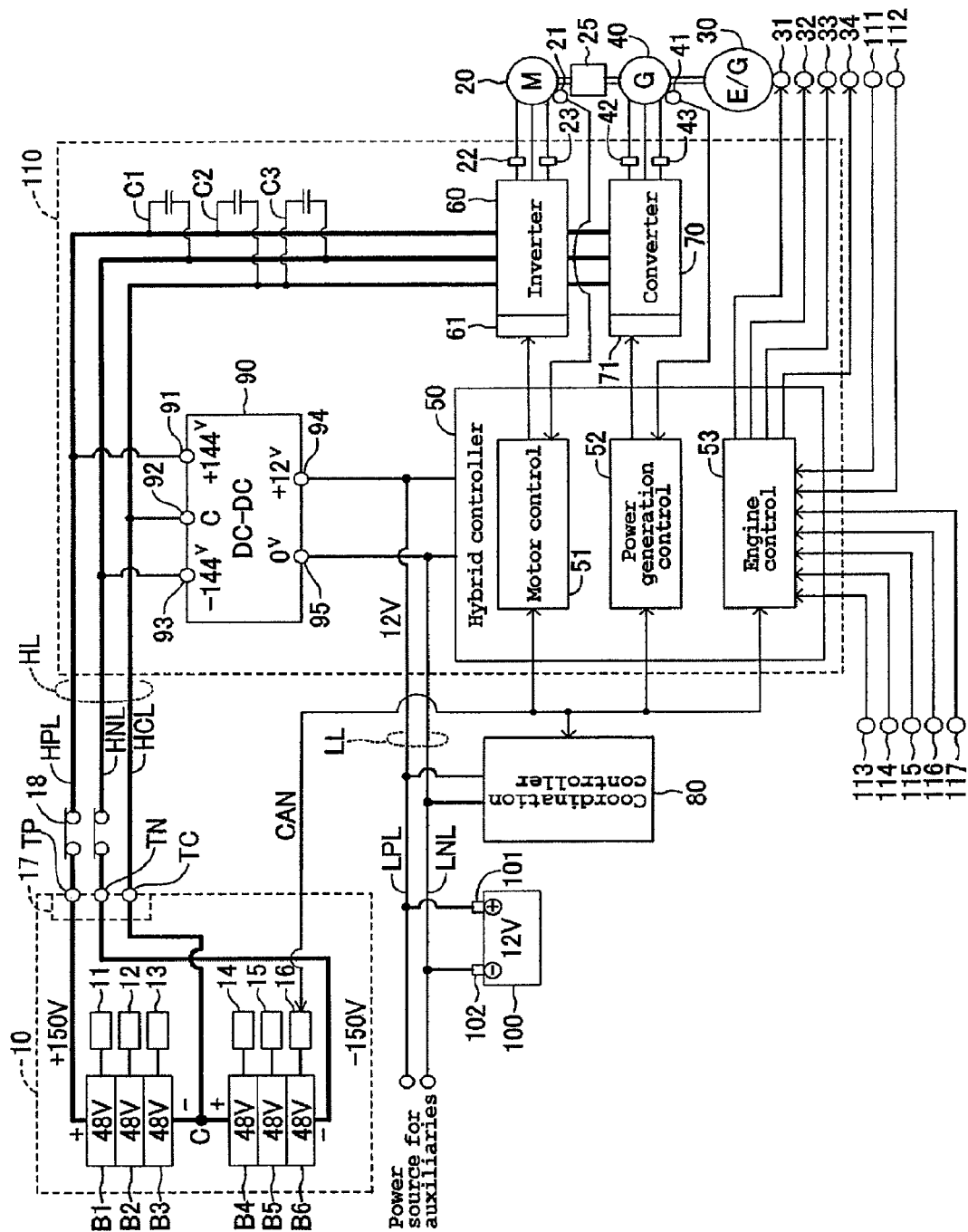

[FIG. 2]
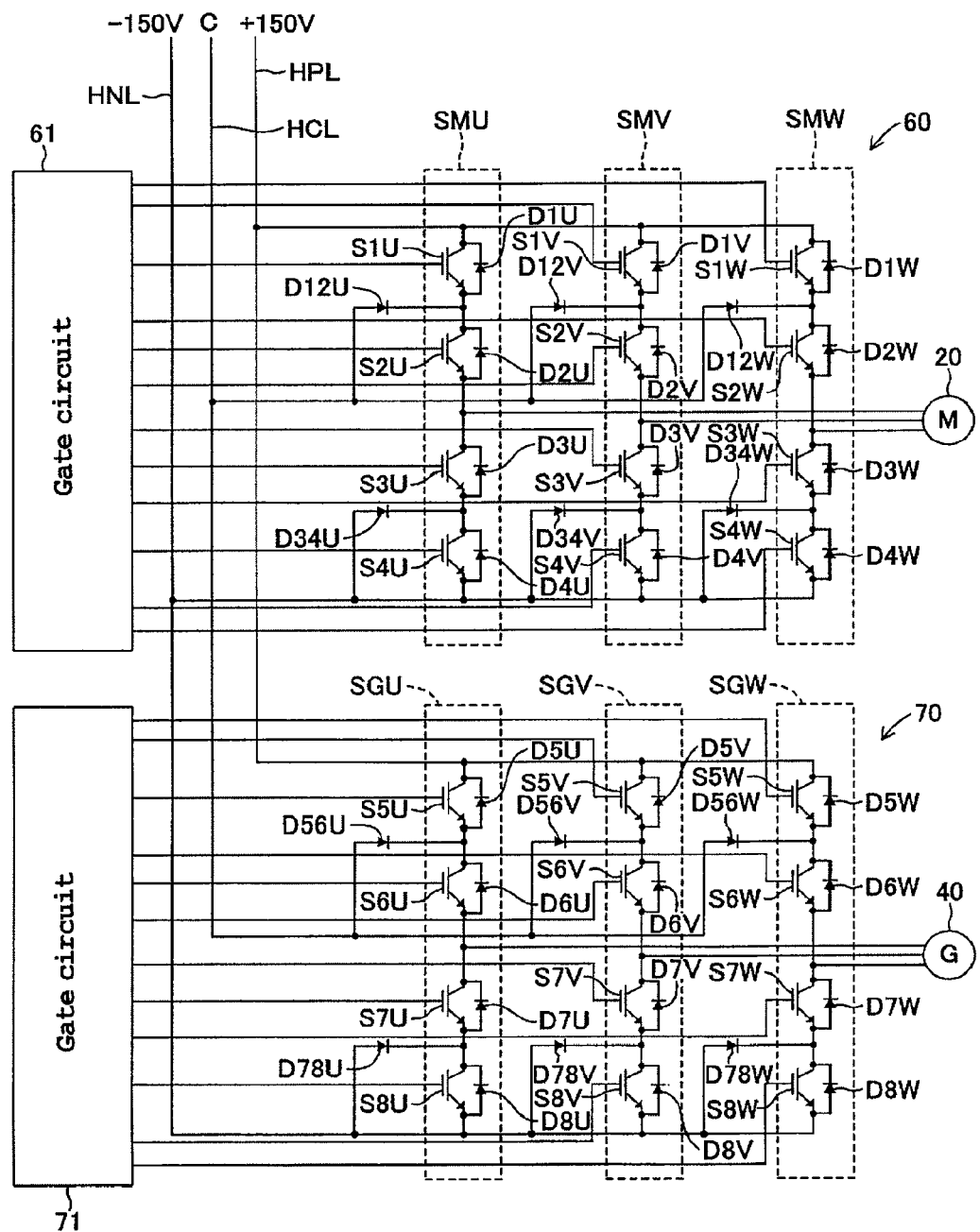

[FIG. 3]
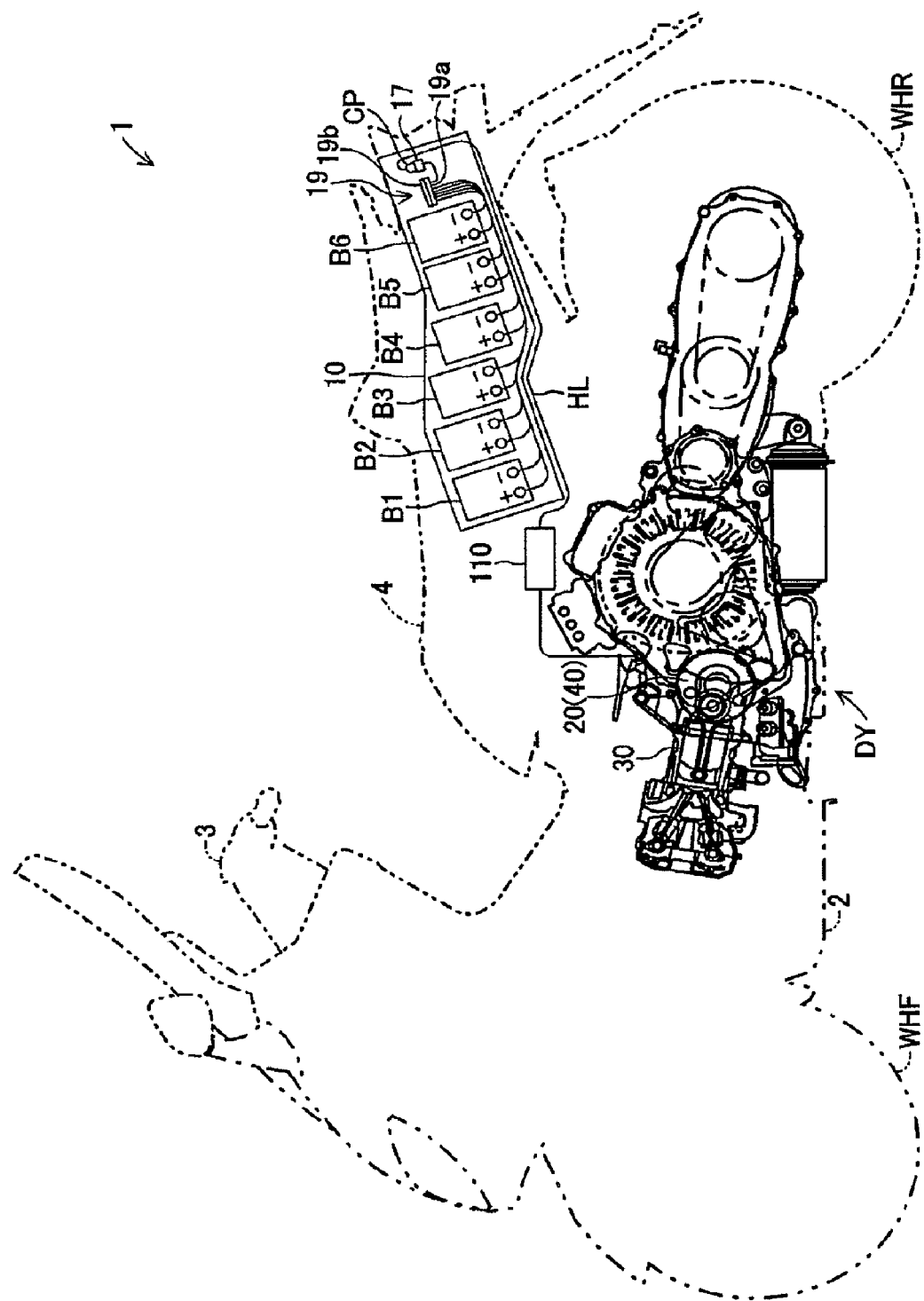

POWER SUPPLY FOR A VEHICLE

CROSS-REFERENCE TO RELATED APPLICATIONS

The present application is based on and claims priority under 35 U.S.C. §119 to Japanese Patent Application No. 2006-075499, filed on Mar. 17, 2006, the entire contents of which are expressly incorporated by reference herein.

BACKGROUND OF THE INVENTION

1. Field of the Invention

The present invention relates to a power supply for supplying high-voltage power to a drive electric motor of a hybrid car or an electric car. Although not limited thereto, the invention has applicability to two-wheeled vehicles.

2. Description of the Related Art

Conventional electrical cars are driven by an electric motor via electric power from a battery. Similarly, hybrid cars are driven via the combination of a gasoline internal combustion engine and an electric motor. In these electric vehicles, as disclosed in, for example, Japanese Publication JP 2005-98251, a high-voltage battery (e.g., 36V) is provided separately from a low-voltage battery (e.g., 12V), and the electric motor is driven by this high-voltage battery.

In order to drive the electric motor efficiently with high output, the voltage of power source battery units has becoming increasingly higher, leading to the adoption of vehicle power supplies in which a plurality of batteries are connected in series to supply high-voltage power on the order of, for example, 300V or 500V.

However, such an increase in power source voltage leads to a corresponding increase in the withstand-voltage performance required of control units or control elements within the power supply system. The power supply system thus becomes more bulky due to the large-scale structure. In other words, the size, weight, and cost of the power supply system increases. Further, the freedom of design is reduced.

SUMMARY OF THE INVENTION

In view of the circumstances noted above, an aspect of at least one of the embodiments disclosed herein is to provide a compact, lightweight, and low-cost power supply for supplying high-voltage power.

In accordance with one aspect of the invention, a power supply for a vehicle, in which a plurality of batteries are serially connected, and in which a high voltage obtained from the serially connected batteries is supplied as a power source to a vehicle-driving electric motor, is provided. The power supply comprises a three-level power line forming a direct-current power supply line with an intermediate connection position of the serially connected batteries serving as a neutral point, the three-level power line including a neutral line connected to the neutral point, a positive potential line connected to a plus-side end of a row of the serially connected batteries, and a negative potential line connected to a minus-side end of the row of the serially connected batteries. The power supply also comprises a three-level inverter for converting direct-current power supplied from the three-level power line into alternating-current power supplied to the electric motor.

In accordance with another aspect of the invention, a power supply for a hybrid vehicle having a generator driven by an internal combustion engine to generate electric power and having a plurality of batteries serially connected to each other in provided, in which a high voltage obtained from the serially connected batteries is supplied as a power source to a vehicle-driving electric motor. The power supply comprises a three-level power line forming a direct-current power supply line with an intermediate connection position of the serially connected batteries serving as a neutral point, the three-level power line including a neutral line connected to the neutral point, a positive potential line connected to a plus-side end of a row of the serially connected batteries, and a negative potential line connected to a minus-side end of the row of the serially connected batteries. The power supply also comprises a three-level inverter for converting direct-current power supplied from the three-level power line into alternating-current power supplied to the electric motor, and a three-level converter for converting an alternating-current output of the generator into a three-level-potential direct-current voltage supplied to the three-level power line.

In accordance with still another aspect of the invention, a power supply for a vehicle, in which a plurality of batteries are serially connected, and in which a high voltage obtained from the serially connected batteries is supplied as a power source to a vehicle-driving electric motor, is provided. The power supply comprises a power supply cable capable of supplying at least three levels of voltage and forming a direct-current power supply line with an intermediate connection position of the serially connected batteries serving as a neutral point, the power supply cable comprising a neutral line connected to the neutral point, a positive potential line connected to a plus-side end of a row of the serially connected batteries, and a negative potential line connected to a minus-side end of the row of the serially connected batteries. The power supply also comprises a three-level inverter for converting direct-current power supplied from the power line into alternating-current power supplied to the electric motor to drive the electric motor, a voltage applied between the neutral line and the positive potential line having substantially the same absolute value as a voltage applied between the neutral line and the negative potential line.

In accordance with yet another aspect of the invention, a power supply for a vehicle, in which a plurality of batteries are serially connected, and in which a high voltage obtained from the serially connected batteries is supplied as a power source to a vehicle-driving electric motor, is provided. The power supply comprises a power supply cable capable of supplying at least three levels of voltage and forming a direct-current power supply line with an intermediate connection position of the serially connected batteries serving as a neutral point, the power supply cable comprising a neutral line connected to the neutral point, a positive potential line connected to a plus-side end of a row of the serially connected batteries, and a negative potential line connected to a minus-side end of the row of the serially connected batteries. The power supply also comprises a three-level inverter for converting direct-current power supplied from the power supply cable into alternating-current power supplied to the electric motor.

BRIEF DESCRIPTION OF THE DRAWINGS

These and other features, aspects and advantages of the present inventions will now be described in connection with preferred embodiments, in reference to the accompanying drawings. The illustrated embodiments, however, are merely examples and are not intended to limit the inventions. The drawings include the following 3 figures.

FIG. 1 is a block diagram showing one embodiment of a power supply control system for a hybrid type vehicle.

FIG. 2 is an electrical circuit diagram of an inverter and a converter according to one embodiment.

FIG. 3 is a schematic view of one embodiment of a hybrid type vehicle.

DETAILED DESCRIPTION OF THE PREFERRED EMBODIMENT

In the following detailed description, terms of orientation such as "right," "left," "front," "rear," "frontward," and "rearward" are used herein to simplify the description of the context of the illustrated embodiments. Moreover, left, right, front and rear directions are described hereinbelow as directions as seen from a driver seated on a seat of a vehicle, such as a motorcycle. Likewise, terms of sequence, such as "first" and "second," are used to simplify the description of the illustrated embodiments. Because other orientations and sequences are possible, however, the present invention should not be limited to the illustrated orientation. Those skilled in the art will appreciate that other orientations of the various components described above are possible.

FIG. 3 shows one embodiment of a hybrid type motorcycle 1. The hybrid type motorcycle 1 is equipped with a front wheel WHF and a rear wheel WHR, and has a drive unit DY arranged in a lower central portion of a vehicle body 2 formed between the front wheel WHF and the rear wheel WHR. A high-voltage power unit 10 can be arranged in a rear portion of the vehicle body 2 above the rear wheel WHR. Further, a pair of handlebars 3 equipped with an accelerator grip and a brake (not shown) are provided in an upper front-side portion of the vehicle body 2, and a seat 4 can extend rearwardly from an upper central portion of the vehicle body 2. The shape of the motorcycle 1 is not limited to that shown in FIG. 3, nor are other conditions of the vehicle limited thereto. Additionally, the inventions disclosed herein are not limited to a so-called motorcycle-type two-wheel vehicle, but are applicable to other types of two-wheel vehicles. Moreover, the inventions disclosed herein are not limited to two-wheel vehicles, but may be used with other types of straddle-type vehicle. Furthermore, some aspects of the invention disclosed herein are not limited to straddle-type vehicles, but can also be used with vehicles with side-by-side seating.

The drive unit DY can include an electric motor 20, an engine 30, a power distributor 25, and a generator 40. Additionally, the hybrid type motorcycle 1 can be configured as a series/parallel hybrid type motorcycle in which the engine 30 and the electric motor 20 are used individually as power sources, or used in combination, to drive the drive wheel (e.g., the rear wheel WHR).

Since the electric motor 20, the power distributor 25, and the generator 40 are arranged side by side in the vehicle width direction rearward of the engine 30, only the electric motor 20 is shown in FIG. 3.

The high-voltage power unit 10 can serve as the power source for the electric motor 20 to drive the drive wheel WHR. The engine 30 can include an internal combustion engine and drive the drive wheel WHR. The generator 40 can be rotationally driven by the engine 30 to generate electric power. Also, a hybrid controller 50 can be provided for controlling the operation of the electric motor 20, generator 40, and engine 30. A three-level inverter 60 can be used for converting direct-current high-voltage power into alternating-current power on the basis of a control signal from the hybrid controller 50 to thereby supply three-phase power to the electric motor 20. Additionally, a three-level converter 70 can convert the electric power generated by the generator 40 from an alternating current to a direct current on the basis of a control signal from the hybrid controller 50. A coordination controller 80 can be used for controlling the entire vehicle system. Also, a low-voltage auxiliary battery 100 (hereinafter, simply referred to as "low-voltage battery 100") can be provided with a rated voltage that in one embodiment can be approximately 12V for supplying power to electrical loads (referred to as "auxiliaries") of a low-voltage system (e.g., 12V system). A DC-DC converter 90 that converts high-voltage power supplied from the high-voltage power unit 10 into low-voltage power (e.g., of 12V) can also be used. Accordingly, even when the capacity of the low-voltage auxiliary battery 100 has dropped, this can be backed up by the high-voltage batteries (e.g., serially connected batteries B1-B6).

The hybrid converter 50, the inverter 60, the converter 70, and the DC-DC converter 90 can be accommodated in an electrical box 110, as illustrated by a dashed-line in FIG. 1.

Further, the power distributor 25 distributes the drive force generated by the engine 30 into at least a drive force for driving the rear wheel WHR and a drive force for driving the generator 40. The power distributor 25 can also combine the drive force provided by the engine 30 and the drive force provided by the electric motor 20 into the drive force for driving the rear wheel WHR. The power distributor 25 can be composed of, for example, a planetary gear mechanism.

The high-voltage power unit 10 can include six battery modules B1, B2, B3, B4, B5, B6, as shown in the embodiment illustrated in FIG. 1. The battery modules B1, B2, B3, B4, B5, B6 can each be composed of 14 lithium battery cells (e.g., single cell voltage=3.4V) connected in series and accommodated within a package, and the output voltage thereof can be set to 48V. However, any other suitable number of batteries can be used, and the batteries can be other than lithium batteries. Also, the batteries can have other single cell voltage and output voltage values than those above.

In the following description, unless individually specified, the battery modules B1, B2, B3, B4, B5, B6 will be generically referred to simply as battery module B. This battery module B corresponds to the battery according to one embodiment of the present invention.

The high-voltage power unit 10 can include a power output terminal strip 17 for connecting the distribution cable for supplying power. The power output terminal strip 17 can include three connection terminals composed of a positive power output terminal TP, a negative power output terminal TN, and a neutral terminal TC. The six battery modules B1, B2, B3, B4, B5, B6 are connected in series. The plus-side end of the row of serially connected batteries (e.g., the plus electrode of the battery module B1) is connected to the positive power output terminal TP, and the minus-side end of the row of serially connected batteries (e.g., the minus electrode of the battery module B6) is connected to the negative power output terminal TN. Further, the intermediate point of the six battery modules B1 to B6 connected in series, that is, the connecting point between the minus electrode of the battery module B3 and the plus electrode of the battery module B4 can serve as a neutral point C to be connected to the neutral terminal TC.

A voltage of +150V relative to the neutral point C, and a voltage of −150V relative to the neutral point C, can be output to the positive power output terminal TP and negative power output terminal TN of the power output terminal strip 17, respectively.

With continued reference to the embodiment illustrated in FIG. 1, since the voltage of the single cells constituting each of the battery modules B1 to B6 is 3.4V at 80% charge and increases to about 3.6V at full charge, in the following description, it is assumed that the serial voltage of three battery modules B is 150V (3.6×14×3).

A three-wire electric power supply cable HL can be connected to the power output terminal strip 17 via an output coupler CP (see FIG. 3). This three-wire electric power supply cable corresponds to a three-level power line. Hereinafter, the three-wire electric power supply cable HL is referred to as high-voltage power supply line HL. Of the high-voltage power supply line HL, the wire connected to the positive power output terminal TP is referred to as high-voltage positive potential line HPL, the wire connected to the negative power output terminal TN is referred to as high-voltage negative potential line HNL, and the wire connected to the neutral terminal TC is referred to as neutral line HCL. However, in other embodiments the power supply cable or power line can have more than three-levels (e.g., the electric power supply cable can have more than three wires). For example, the power line can have multiple positive potential lines and multiple negative potential lines.

Sub battery management controllers 11, 12, 13, 14, 15 can be connected to the battery modules B1, B2, B3, B4, B5, respectively, and a main battery management controller 16 can be connected to the battery module B6. Each of the sub battery management controllers 11, 12, 13, 14, 15 detects the charge status of the battery modules B1, B2, B3, B4, B5 from the charge/discharge capacity, the temperature, and the like in each of the battery modules B1, B2, B3, B4, B5, and transmits the charge status data to the main battery management controller 16. The main battery management controller 16 detects the charge status in the battery module B6, and transmits the charge status data to the coordination controller 80 together with the charge status data transmitted from the sub battery management controllers 11, 12, 13, 14, 15.

As shown in FIG. 3, the high-voltage power unit 10 configured as described above can be installed in the rear portion of the vehicle body 2 above the rear wheel WHR. In the high-voltage power unit 10, the battery modules B can be arranged in a row along the longitudinal direction of the vehicle, with a safety plug device 19 and the power output terminal strip 17 provided rearward thereof.

The safety plus device 19 can be used to perform the serial connection of the six battery modules B at once at one location. The safety plus device 19 includes a female electrode strip 19a having a female electrode (not shown) that is electrically connected to the plus electrode terminal and minus electrode terminal of each battery module B. The six battery modules B are serially connected by inserting a male electrode plug 19b into the female electrode strip 19a, and the serial connection of all the battery modules B is cut off by detaching the male electrode plug 19b.

Connected to the power output terminal strip 17 via the safety plug device 19 are the plus electrode terminal of the battery module B1, the minus electrode terminal of the battery module B6, and the connecting point (neutral point C) between the battery module B3 and the battery module B4.

The high-voltage power supply line HL is provided with a system main relay 18. Upon turning on an ignition switch (not shown), the coordination controller 80 can carry out a diagnosis of the vehicle control system, and when the use of the high-voltage power unit 10 is permitted as a result of this diagnosis, the contact of the system main relay 18 turns on. This contact of the system main relay 18 can be provided in each of the high-voltage positive potential line HPL and the high-voltage negative potential line HNL in the high-voltage power supply line HL.

Three smoothing capacitors C1, C2, C3 can be provided in the high-voltage power supply line HL between the high-voltage power unit 10 and the inverter 60. That is, the smoothing capacitor C1 can be provided between the high-voltage positive potential line HPL and the high-voltage negative potential line HNL, the smoothing capacitor C2 can be provided between the high-voltage positive potential line HPL and the neutral line HCL, and the smoothing capacitor C3 can be provided between the high-voltage negative potential line HNL and the neutral line HCL.

A low-voltage battery 100 can serve as a power source for auxiliary components such as a lamp, and control units such as the coordination controller 80 and the hybrid controller 50. A two-wire low-voltage power supply line LL is connected to a plus power terminal 101 and minus power terminal 102 of the low-voltage battery 100. Hereinafter, of the low-voltage power supply line LL, the wire connected to the plus power terminal 101 of the low-voltage battery 100 is referred to as low-voltage positive line LPL, and the wire connected to the minus power terminal 102 thereof is referred to as low-voltage negative line LNL.

In one embodiment, the minus power terminal 102 of the low-voltage battery 100 is not grounded to the vehicle body.

The DC-DC converter 90 can include three input terminals 91, 92, 93 that are branched and connected from the high-voltage power supply line HL. The high-voltage positive potential line HPL, the neutral line HCL, and the high-voltage negative potential line HNL can be connected to the input terminals 91, 92, and 93, respectively.

The DC-DC converter 90 can convert each of +150V direct-current voltage between the neutral line HCL and the high-voltage positive potential line HPL, and −150V direct-current voltage between the neutral line HCL and the high-voltage negative potential line HNL into +12V direct-current voltage. For example, after converting direct-current into alternating-current by a transistor bridge circuit, the voltage can be lowered by a transformer, followed by passage through a rectifying circuit and a smoothing circuit to thereby obtain more stable direct-current power (these circuits are not shown).

The DC-DC converter 90 includes output terminals 94, 95 for outputting the direct-current power with the lowered voltage. The voltage between the output terminal 94 and the output terminal 95 can be 12V, but other voltage values are possible. The output terminal 94, which is at a higher potential, is connected to the low-voltage positive line LPL of the low-voltage power supply line LL, and the output terminal 95 at a lower potential is connected to the low-voltage negative line LNL of the low-voltage power supply line LL.

Further, inside the DC-DC converter 90, the neutral line HCL of the high-voltage power supply line HL and the low-voltage negative line LNL of the low-voltage power supply line LL are connected to each other. The operation of the DC-DC converter 90 can thus be stabilized to achieve high efficiency.

Further, the neutral line HCL and the low-voltage negative line LNL are preferably not grounded to the vehicle body. This arrangement inhibits electrical shocks, which might occur if the lines were grounded to the vehicle body and an electrical leak occurred.

In the DC-DC converter 90, in order to output a direct-current power source voltage of 12V, when the battery voltage of the low-voltage battery 100 has dropped due to a decrease in its remaining capacity, the low-voltage battery 100 is charged with the output of the DC-DC converter 90. At this time, the DC-DC converter 90 supplies power also to the electrical loads of a low-voltage system.

In addition to the auxiliary components such as a lamp, the coordination controller 90 and the hybrid controller 50 can be connected to the low-voltage power supply line LL.

The coordination controller 80 is responsible for the coordinated control of the entire vehicle and can be composed of a microcomputer. The coordination controller 80 can acquire operation information and vehicle state information acquired from various sensors (not shown), calculate a drive command value for each of the electric motor 20, generator 40, and engine 30, and output a control command for the same to the hybrid controller 50, while controlling the actuation of other actuators.

Examples of information input to the coordination controller 80 include accelerator opening information, ignition switch information, vehicle speed information, cooling-water temperature information, high-voltage-battery voltage information, low-voltage-battery voltage information, fuel injection amount information, and fuel remaining-amount information.

Further, on the basis of these various information, the coordination controller 80 drives and controls actuators, such as a cooling-water pump and a cooling fan (not shown), and outputs a start/stop command for the voltage-lowering operation of the DC-DC converter 90, an activation command for the battery management controllers 11 to 16, and the like.

The coordination controller 80, the hybrid controller 50, and the main battery management controller 16 are capable of communicating with each other through a CAN (Controller Area Network) communication. However, in other embodiments, communication between the coordination controller 80, hybrid controller 50, the main battery controller 16 and sensors, such as the sensors described below, can be done via a wireless connection (e.g., Rf communication).

The coordination controller 80 can calculate a torque command value for the electric motor 20, a speed command value and torque command value for the generator 40, and an opening command value for the throttle valve of the engine 30 on the basis of operation information or vehicle state information such as accelerator opening information, and output the calculated command values to the hybrid controller 50.

The hybrid controller 50 can be composed of a microcomputer. The hybrid controller 50 can be roughly divided into a motor controlling section 51, a power generation controlling section 52, and an engine controlling section 53.

On the basis of a motor torque command value input from the coordination controller 80, the motor controlling section 51 can control the inverter 60 via a gate circuit 61 so that a current corresponding to the torque command value flows in the electric motor 20.

The electric motor 20 can be a permanent magnet type synchronous motor having a permanent magnet embedded in the rotor, and U, V, and W phase coils provided in the stator at a pitch of 120°. The electric motor 20 is provided with a resolver 21 for detecting the rotation angle thereof. Further, current sensors 22, 23 for detecting a current value are provided in the power supply line for the electric motor 20.

On the basis of rotation angle information from the resolver 21 and current value information from the current sensors 22, 23, the motor controlling section 51 can perform PWM control on each switching element (which will be described later) of the gate circuit 61 at a duty ratio corresponding to the torque command value.

The power generation controlling section 52 can control the converter 70 via a gate circuit 71 using at least a speed command value and a generator torque command value that are input from the coordination controller 80, thereby adjusting the amount of power generation by the generator 40.

In one embodiment, a permanent magnet type synchronous motor similar to the electric motor 20 is used for the generator 40. The generator 40 can be used not only for generating electric power but also as a rotational drive source (electric motor).

As shown in FIG. 1, the generator 40 can be provided with a resolver 41 for detecting the rotational angle thereof. Current sensors 42, 43 for detecting a current value can also be provided in the electric power output line for the generator 40. On the basis of rotation angle information from the resolver 41 and current value information from the current sensors 42, 43, the power generation controlling section 52 can perform PWM control on each switching element (which will be described later) of the gate circuit 71 at a duty ratio corresponding to the torque command value and the speed command value.

The engine controlling section 53 can acquire detection information from sensors, such as a throttle opening sensor 111, a crank angle sensor 112, a front wheel speed sensor 113, a rear wheel speed sensor 114, an intake pressure sensor 115, an intake temperature sensor 116, and a cooling-water temperature sensor 117. Further, the engine controlling section 53 can drive and control actuators, such as a throttle opening adjusting motor 31, an injector 32, an ignition coil 33, and a fuel pump 34, on the basis of the throttle opening command input from the coordination controller 80.

The inverter 60 can be a three-level inverter for converting three-level-potential direct-current power supplied from the high-voltage power supply line HL into three-phase alternating-current power. The inverter 60 can be controlled so that a three-phase alternating-current voltage corresponding to the drive command value from the hybrid controller 50 is output to the electric motor 20.

As shown in FIG. 2, the inverter 60 can include three switching rows (e.g., a U-phase switching row SMU, a V-phase switching row SMV, and a W-phase switching row SMW) arranged in parallel between the high-voltage positive potential line HPL and the high-voltage negative potential line HNL.

The U-phase switching row SMU is composed of switching elements S1U, S2U, S3U, S4U that are connected in series, and diodes D1U, D2U, D3U, D4U that are connected in an inverse-parallel manner to the respective switching elements S1U, S2U, S3U, S4U. The connecting point between the emitter of the switching element S2U and the collector of the switching element S3U is connected to the U phase of the electric motor 20. Further, the neutral line HCL is connected to the connecting point between the emitter of the switching element S1U and the collector of the switching element S2U. In the connecting line connecting to the emitter of the switching element S1U from this neutral line HCL, a diode D12U is provided with the cathode facing toward the switching element S1U.

Further, the high-voltage negative potential line HNL is connected to the connecting point between the emitter of the switching element S3U and the collector of the switching element S4U. In the connecting line connecting to the emitter of the switching element S3U from this high-voltage negative potential line HNL, a diode D34U is provided with the cathode facing toward the switching element S3U.

Since the V-phase switching row SMV and the W-phase switching row SMW are of the same circuit configuration as the U-phase switching row SMU, in FIG. 2, the respective elements are denoted by the same symbols (except the last character of each symbol, which indicates the kind of the switching row) and description thereof is not repeated.

In the V-phase switching row SMV, the connecting point between the emitter of the switching element S2V and the collector of the switching element S3V is connected to the V phase of the electric motor 20, and in the W-phase switching row SMW, the connecting point between the emitter of the switching element S2W and the collector of the switching element S3W is connected to the W phase of the electric motor 20.

Further, an FET or IGBT can be used as each of the switching elements S1U to S4U, S1V to S4V, S1W to S4W, for example.

Each of the switching elements S1U to S4U, S1V to S4V, S1W to S4W can be on/off controlled with a shift of 120° between the phases, on the basis of a pulse signal output from the gate circuit 61. Accordingly, the inverter 60 can convert direct-current power supplied from the high-voltage power supply line HL into three-phase alternating-current power for output to the electric motor 20.

Description will be given of the U-phase switching row SMW, for example. The output voltage to the U phase of the electric motor 20 can be set to +150V by turning the switching elements S1U, S2U on and the switching elements S3U, S4U off. The output voltage of the U phase of the electric motor 20 can also be set to 0V by turning the switching elements S2U, S3U on and the switching elements S1U, S4U off. In another example, the output voltage of the U phase of the electric motor 20 can be set to −150V by turning the switching elements S3, S4 on and the switching elements S1U, S2U off. The same applies to the other switching rows SMV, SMW. Accordingly, three levels of voltages: positive, negative, and zero, can be output to the U, V, W phases of the electric motor 20 by switching the on/off of each of the switching elements S1U to S4U, S1V to S4V, S1W to S4W.

At this time, the motor controlling section 51 adjusts the output voltage through PWM control, that is, by controlling the on/off time ratio (duty ratio) of each of the switching elements S1U to S4U, S1V to S4V, S1W to S4W, thereby creating three-phase alternating-current power.

For example, three-phase alternating-current power can be created by setting the on-time of PWM control on the basis of a comparison (e.g., size relationship) between a target voltage sine waveform corresponding to a torque command value and a preset carrier waveform (e.g., delta wave), and by providing a phase shift of 120° between the U, V, W phases.

Further, in controlling the electric motor 20, the motor controlling section 51 computes a current command value (id, iq) in the d-q coordinate system corresponding to the torque command value, and coordinate-converts the three-phase current value detected by the current sensors 22, 23 into a two-phase current value (idx, iqx) on the basis of the rotation angle detected by the resolver 21. Then, on the basis of the deviation between this two-phase current value (idx, iqx) and the current command value (id, iq), target drive voltages for the three phases of the electric motor 20 can be calculated, and the respective switching elements S1U to S4U, S1V to S4V, S1W to S4W are on/off controlled at duty ratios corresponding to the voltages.

According to the inverter 60 as described above, even in the case of a configuration in which alternating-current power of a high voltage of 300V in terms of amplitude value is supplied to the electric motor 20, as the direct-current input power, only half the voltage, +150V and −150V relative to the neutral point C, suffices.

Accordingly, even when the voltage of the power unit in the hybrid vehicle is increased, high withstand-voltage performance is not required of the control elements or control units, and it suffices to satisfy a withstand voltage of 150V. It is thus possible to achieve a reduction in the size, weight, and cost of the power supply system. Further, the freedom of design can be also increased.

In contrast, in the case of the high-voltage power supply of the related art, when driving the electric motor at the same voltage of 300V (amplitude value), due to the use of a two-wire power supply line of 0V-300V, high withstand-voltage performance (300V) is required of the control units or control elements connected to that power supply line.

The converter 70 can be a three-level converter that converts the three-phase alternating-current electric power generated by the generator 40 into three-level direct-current electric power, and controls the amount of power generation in accordance with the speed (rpm) command value and torque command value from the hybrid controller 50.

As shown in FIG. 2, the converter 70 can be provided in parallel to the inverter 60 with respect to the high-voltage power supply line HL, and can include three switching rows (a U-phase switching row SGU, a V-phase switching row SGV, and a W-phase switching row SGW) arranged in parallel between the high-voltage positive potential line HPL and the high-voltage negative potential line HNL.

The U-phase switching row SGU is composed of switching elements S5U, S6U, S7U, S8U that are connected in series, and diodes D5U, D6U, D7U, and D8U that are connected in inverse-parallel to the respective switching elements S5U, S6U, S7U, S8U. The connecting point between the emitter of the switching element S6U and the collector of the switching element S7U is connected to the U phase of the generator 40. Further, the neutral line HCL is connected to the connecting point between the emitter of the switching element S5U and the collector of the switching element S6U. In the connecting line connecting to the emitter of the switching element S5U from this neutral line HCL, a diode D56U is provided with the cathode facing toward the switching element S5U.

Further, the high-voltage negative potential line HNL is connected to the connecting point between the emitter of the switching element S7U and the collector of the switching element S8U. In the connecting line connecting to the emitter of the switching element S7U from this high-voltage negative potential line HNL, a diode D78U is provided with the cathode facing toward the switching element S7U.

Since the V-phase switching row SGV and the W-phase switching row SGW are of the same circuit configuration as the U-phase switching row SGU, in FIG. 2, the respective elements are denoted by the same symbols (except the last character of each symbol, which indicates the kind of the switching row) and description thereof is not repeated.

In the V-phase switching row SGV, the connecting point between the emitter of the switching element S6V and the collector of the switching element S7V is connected to the V phase of the generator 40, and in the W-phase switching row SGW, the connecting point between the emitter of the switching element S6W and the collector of the switching element S7W is connected to the W phase of the generator 40.

In the generator 40, the rotor is rotated as the rotary force is transmitted from the engine 30 by the power distributor 25, thereby generating three-phase alternating-current power due to a counter electromotive force. Then, in the converter 70, each of the switching elements S5U to S8U, S5V to S8V, S5W to S8W is on/off controlled in synchronization with the rotation angle of the generator 40 via a pulse signal output from the gate circuit 71, thereby converting the three-phase alternating-current electric power generated by the generator 40 into three-level-potential direct-current electric power. The conversion of the three level potentials may be effected by the on/off control of each of the switching elements S5U to S8U, S5V to S8V, S5W to S8W in the same manner as in the inverter 60.

The output of the converter 70 can be connected to the high-voltage power supply line HL. In this case, the battery modules B of the high-voltage power unit 10 are charged due to the potential difference between the output of the converter 70 and the high-voltage power supply line HL. Accordingly, as for the output of the converter 70, the output voltage to the high-voltage positive potential line HPL with respect to the neutral point C is set higher than +150V, and the output voltage to the high-voltage negative potential line HNL is set lower than −150V.

The power generation controlling section 52 of the hybrid controller 50 adjusts the direct-current output voltage through PWM control, that is, by controlling the duty ratio of each of the switching elements S5U to S8U, S5V to S8V, S5W to S8W. This PWM control is performed in the same manner as in the motor controlling section 51; the output voltage is controlled to a target voltage corresponding to the torque command value and the speed command value, on the basis of the current value detected by the current sensors 42, 43 and the rotation angle detected by the resolver 41.

According to the converter 70 as described above, the three-phase alternating-current electric power generated by the generator 40 is converted into three-level-potential direct-current electric power, thereby making it possible to charge each battery module B of the high-voltage power unit 10 via the high-voltage power supply line HL. Further, this can also be used as a power source for the electric motor 20. Furthermore, the converter 70 may be made to function as an inverter to rotate the generator 40 like the electric motor 20, thereby effecting the startup of the engine 30, or the like.

The inverter 60 and the converter 70 as described above can each be equipped with a radiator (not shown), with radiator-cooling water circulated inside this radiator to thereby effect cooling. Further, the electric motor 20 and the generator 40 may also be cooled with cooling water flowing in a common circulation path.

As has been described above, according to the power supply of this embodiment, with the intermediate connecting point of the serially connected battery modules B serving as the electrical neutral point C, high-voltage power is supplied via the three-level-potential high-voltage power supply line using this neutral point C. Accordingly, the withstand voltage required of the control units or control elements (such as the DC-DC converter 90, the system main relay 18, the capacitors C1 to C3, the inverter 60, and the converter 70) can be halved. With respect to the requisite voltage for driving the electric motor 20, the voltage to be applied between the neutral line HCL and the high voltage positive potential line HPL, and the voltage to be applied between the neutral line HCL and the high-voltage negative potential line HNL, can be halved.

As a result, it is possible to halve the withstand voltage required of control units or control elements connected to the power line, as compared with the related art. Therefore, it is possible to achieve a reduction in the size, weight, and cost of the power supply system. Accordingly, the power supply system proves effective particularly when applied to a hybrid type motorcycle with a narrow installation space. Further, the limitations on the withstand-voltage performance of the control units or control elements are reduced, thereby increasing the freedom of design.

Further, since the generated alternating-current electric power is converted into direct-current electric power by the three-level converter 70, the battery modules B of the high-voltage power unit 10 can be charged via the high-voltage power supply line HL.

Further, since the high-voltage power source voltage supplied from the high-voltage power supply line HL is lowered by the DC-DC converter 90 and then output to the low-voltage power supply line LL, it is possible to charge the low-voltage battery 100 and thus keep the low-voltage battery 100 in a favorable state.

In addition, since the low-voltage negative line LNL in the low-voltage power supply line LL and the neutral line HCL in the high-voltage power supply line HL are connected to each other, the operation of the DC-DC converter 90 becomes stable and high efficiency can be attained.

While the power supply for an electric vehicle according to this embodiment has been described, the present invention is not limited to the above-mentioned embodiment, and various modifications can be made without departing from the object of the present invention.

For example, the foregoing description is directed to the power supply applied to a hybrid type motorcycle. However, the present invention may be applied not only to a motorcycle or also to a four-wheeled car or the like, or to an electric car not equipped with an engine.

Further, while in this embodiment the power supply can be equipped with the DC-DC converter 90 as a back up for the low-voltage power source, such a structure may be omitted. Further, while two kinds of power source voltage at the potentials of +150V and −150V relative to the neutral line HCL are used in the DC-DC converter 90, it is also possible to use either one of the power source voltages (+150V or −150V).

The power supply system from the high-voltage power unit 10 to the inverter 60 corresponds to the power supply according to the present invention. Further, it is also possible to construct the power supply according to the present invention so as to include also the converter 70, the DC-DC converter 90, the low-voltage battery 100, and the low-voltage power supply line LL.

Although these inventions have been disclosed in the context of a certain preferred embodiments and examples, it will be understood by those skilled in the art that the present inventions extend beyond the specifically disclosed embodiments to other alternative embodiments and/or uses of the inventions and obvious modifications and equivalents thereof. In addition, while a number of variations of the inventions have been shown and described in detail, other modifications, which are within the scope of the inventions, will be readily apparent to those of skill in the art based upon this disclosure. It is also contemplated that various combinations or subcombinations of the specific features and aspects of the embodiments may be made and still fall within one or more of the inventions. Accordingly, it should be understood that various features and aspects of the disclosed embodiments can be combine with or substituted for one another in order to form varying modes of the disclosed inventions. Thus, it is intended that the scope of the present inventions herein disclosed should not be limited by the particular disclosed embodiments described above.

What is claimed is:

1. A power supply for a vehicle, in which a plurality of batteries are serially connected, and in which a high voltage obtained from the serially connected batteries is supplied as a DC power source to a vehicle-driving electric motor, comprising:

a three-level power line forming a direct-current (DC) power supply line with an intermediate connection position of the serially connected batteries serving as a neutral point, the three-level power line including a neutral line connected to the neutral point, a first potential line connected to one end of a row of the serially connected batteries, and a second potential line connected to an opposite end of the row of the serially connected batteries, such that a DC power plus side is provided between the first potential line and the neutral point and a DC power minus side is provided between the second potential line and the neutral point; and a three-level inverter for converting direct-current power supplied from the DC power source via the three-level power line into three-phase alternating-current power supplied to the electric motor, said alternating-current power having a sine waveform where zero points of the sine waveform correspond to the neutral point of the DC power source, the three-level inverter comprising three switching rows arranged in parallel between the first potential line and the second potential line.

2. The power supply of claim 1,
wherein the vehicle is a hybrid type vehicle including a generator that is driven by at least an internal combustion engine to generate electric power; and
the power supply further comprises a three-level converter for converting an alternating-current output of the generator into a three-level-potential direct-current voltage supplied to the three-level power line.

3. The power supply of claim 1, further comprising:
a low-voltage auxiliary battery that is different from the batteries for supplying power to the three-level power line; and
a DC-DC converter for converting a power source voltage supplied to the three-level power line into a rated voltage of the low-voltage auxiliary battery,
wherein an output of the DC-DC converter is connected to a power supply line for the low-voltage auxiliary battery, and wherein a negative-side of the power supply line for the low-voltage auxiliary battery is connected to the neutral line of the three-level power line.

4. The power supply of claim 1, wherein the relative absolute potential between the first potential line and the neutral line and between the second potential line and neutral line is substantially the same.

5. A power supply for a hybrid vehicle having a generator driven by an internal combustion engine to generate electric power and having a plurality of batteries serially connected to each other, in which a high voltage obtained from the serially connected batteries is supplied as a DC power source to a vehicle-driving electric motor, comprising:
a three-level power line forming a direct-current (DC) power supply line with an intermediate connection position of the serially connected batteries serving as a neutral point, the three-level power line including a neutral line connected to the neutral point, a first potential line connected to one end of a row of the serially connected batteries, and a second potential line connected to an opposite end of the row of the serially connected batteries, such that a DC power plus side is provided between the first potential line and the neutral point and a DC power minus side is provided between the second potential line and the neutral point;

a three-level inverter for converting direct-current power supplied from the DC power source via the three-level power line into three-phase alternating-current power supplied to the electric motor, said alternating-current power having a sine waveform where zero points of the sine waveform correspond to the neutral point of the DC power source, the three-level inverter comprising three switching rows arranged in parallel between the first potential line and the second potential line; and a three-level converter for converting an alternating-current output of the generator into a three-level-potential direct-current voltage supplied to the three-level power line.

6. The power supply of claim 5, further comprising:
a low-voltage auxiliary battery; and
a DC-DC converter for converting a power source voltage supplied to the three-level power line into a rated voltage of the low-voltage auxiliary battery,
wherein an output of the DC-DC converter is connected to a power supply line for the low-voltage auxiliary battery, and wherein a negative-side of the power supply line for the low-voltage auxiliary battery is connected to the neutral line of the three-level power line.

7. The power supply of claim 5, wherein the electric motor is arranged to power a single wheel of the vehicle.

8. A power supply for a vehicle, in which a plurality of batteries are serially connected, and in which a high voltage obtained from the serially connected batteries is supplied as a DC power source to a vehicle-driving electric motor, comprising:
a power supply cable capable of supplying at least three levels of voltage and forming a direct-current (DC) power supply line with an intermediate connection position of the serially connected batteries serving as a neutral point, the power supply cable comprising a neutral line connected to the neutral point, a first potential line connected to one end of a row of the serially connected batteries, and a second potential line connected to an opposite end of the row of the serially connected batteries; and
a three-level inverter for converting direct-current power supplied from the DC power source via the power supply cable into three-phase alternating-current power supplied to the electric motor to drive the electric motor, said alternating-current power having a sine waveform where zero points of the sine waveform correspond to the neutral point of the DC power source, the three-level inverter comprising three switching rows arranged in parallel between the first potential line and the second potential line, a voltage applied between the neutral line and the first potential line having substantially the same absolute value as a voltage applied between the neutral line and the second potential line.

9. A power supply for a vehicle, in which a plurality of batteries are serially connected, and in which a high voltage obtained from the serially connected batteries is supplied as a DC power source to a vehicle-driving electric motor, comprising:
a power supply cable capable of supplying at least three levels of voltage and forming a direct-current (DC) power supply line with an intermediate connection position of the serially connected batteries serving as a neutral point, the power supply cable comprising a neutral line connected to the neutral point, a first potential line connected to one end of a row of the serially connected batteries, and a second potential line connected to an opposite end of the row of the serially connected batteries; and
a three-level inverter for converting direct-current power supplied from the DC power source via the power supply cable into three-phase alternating-current power supplied to the electric motor, said alternating-current power having a sine waveform where zero points of the sine waveform correspond to the neutral point of the DC power source, the three-level inverter comprising three switching rows arranged in parallel between the first potential line and the second potential line.

10. The power supply of claim 9, wherein the withstand voltage required of control units coupled to the power line is halved.

11. The power supply of claim 9,
wherein the vehicle is a hybrid type vehicle including a generator that is driven by at least an internal combustion engine to generate electric power; and
the power supply further comprises a three-level converter for converting an alternating-current output of the generator into a three-level-potential direct-current voltage supplied to the power supply cable.

12. A power supply for an electric vehicle, in which a plurality of batteries are serially connected, and in which a high voltage obtained from the serially connected batteries is supplied as a power source to a vehicle-driving electric motor, comprising:
a three-level power line forming a direct-current power supply line with an intermediate connection position of the serially connected batteries serving as a neutral point, the three-level power line including a neutral line connected to the neutral point, a positive potential line connected to a plus-side end of a row of the serially connected batteries, and a negative potential line connected to a minus-side end of the row of the serially connected batteries;
a three-level inverter for converting direct-current power supplied from the three-level power line into alternating-current power supplied to the electric motor;
a low-voltage auxiliary battery that is different from the serially connected batteries for supplying power to the three-level power line; and
a DC-DC converter for converting a power source voltage supplied to the three-level power line into a rated voltage of the low-voltage auxiliary battery,
wherein an output of the DC-DC converter is connected to a power supply line for the low-voltage auxiliary battery, and wherein a negative-side of the power supply line for the low-voltage auxiliary battery is connected to the neutral line of the three-level power line.

13. A power supply for a hybrid vehicle having a generator driven by an internal combustion engine in generate electric power and having a plurality of batteries serially connected to each other, in which a high voltage obtained from the serially connected batteries is supplied as a power source to a vehicle-driving electric motor, comprising:
a three-level power line forming a direct-current power supply line with an intermediate connection position of the serially connected batteries serving as a neutral point, the three-level power line including a neutral line connected to the neutral point, a positive potential line connected to a plus-side end of a row of the serially connected batteries, and a negative potential line connected to a minus-side end of the row of the serially connected batteries;
a three-level inverter for converting direct-current power supplied from the three-level power line into alternating-current power supplied to the electric motor;
a three-level converter for converting an alternating-current output of the generator into a three-level-potential direct-current voltage supplied to the three-level power line;
a low-voltage auxiliary battery; and
a DC-DC converter for converting a power source voltage supplied to the three-level power line into a rated voltage of the low-voltage auxiliary battery,
wherein an output of the DC-DC converter is connected to a power supply line for the low-voltage auxiliary battery, and wherein a negative-side of the power supply line for the low-voltage auxiliary battery is connected to the neutral line of the three-level power line.

* * * * *